(12) United States Patent
Yu et al.

(10) Patent No.: US 11,546,577 B2
(45) Date of Patent: Jan. 3, 2023

(54) VIDEO JITTER DETECTION METHOD AND APPARATUS

(71) Applicant: BEIJING BAIDU NETCOM SCIENCE TECHNOLOGY CO., LTD., Beijing (CN)

(72) Inventors: Tianbao Yu, Beijing (CN); Tiansheng Deng, Beijing (CN); Peng Du, Beijing (CN); Ting Yun, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 102 days.

(21) Appl. No.: 16/985,123

(22) Filed: Aug. 4, 2020

(65) Prior Publication Data

US 2021/0195170 A1   Jun. 24, 2021

(30) Foreign Application Priority Data

Dec. 18, 2019   (CN) .......................... 201911310784.7

(51) Int. Cl.
  *H04N 17/00*   (2006.01)
  *H04N 5/14*   (2006.01)

(52) U.S. Cl.
  CPC ........... *H04N 17/004* (2013.01); *H04N 5/144* (2013.01)

(58) Field of Classification Search
  None
  See application file for complete search history.

(56) References Cited

U.S. PATENT DOCUMENTS

| 6,721,016 B1* | 4/2004 | Hamajima | ............ H04N 5/142 348/625 |
| 2008/0309769 A1* | 12/2008 | Albu | ..................... H04N 5/144 348/208.1 |

(Continued)

FOREIGN PATENT DOCUMENTS

| CN | 102421008 A | 4/2012 |
| CN | 104410855 A | 3/2015 |

(Continued)

OTHER PUBLICATIONS

European Search Report in CN Patent Application No. 20189250.2 dated Oct. 26, 2020.

(Continued)

*Primary Examiner* — Samira Monshi
(74) *Attorney, Agent, or Firm* — Dilworth IP, LLC (57) ABSTRACT

The present disclosure provides a video jitter detection method and an apparatus. The video jitter detection method includes: acquiring a video; inputting the video into a detection model to obtain an evaluation value of the video, where the evaluation value is used to indicate a degree of jitter of the video; where the detection model is a model obtained by training using video samples in a video sample set as inputs and evaluation values of the video samples in the video sample set as outputs. By inputting the video to be detected into the detection model, the evaluation value of the video can be acquired through the detection model, thereby whether the video is jittery is determined, which realizes the video jitter detection end-to-end, and improves the detection accuracy and robustness of video jitter.

18 Claims, 3 Drawing Sheets

(56) References Cited

U.S. PATENT DOCUMENTS

| | | | |
|---|---|---|---|
| 2011/0193978 A1* | 8/2011 | Wu | G06T 7/207 |
| | | | 348/208.6 |
| 2015/0256755 A1* | 9/2015 | Wu | G06T 7/277 |
| | | | 348/208.6 |
| 2015/0341812 A1 | 11/2015 | Dion et al. | |
| 2020/0267296 A1* | 8/2020 | Usui | H04N 5/262 |
| 2020/0304717 A1* | 9/2020 | Park | H04N 5/232123 |
| 2020/0314330 A1* | 10/2020 | Takayama | H04N 5/23203 |
| 2020/0314331 A1* | 10/2020 | Ouchi | H04N 5/23222 |
| 2020/0327648 A1* | 10/2020 | Lin | G06T 5/007 |
| 2020/0336653 A1* | 10/2020 | Kim | H04N 5/378 |
| 2020/0349680 A1* | 11/2020 | Tao | G06T 3/4046 |
| 2020/0366814 A1* | 11/2020 | Dan | H04N 5/14 |
| 2020/0374458 A1* | 11/2020 | Sato | H04N 5/23267 |

FOREIGN PATENT DOCUMENTS

| | | | |
|---|---|---|---|
| CN | 108122234 A | 6/2018 | |
| CN | 108337505 A | 7/2018 | |
| CN | 109685785 A | 4/2019 | |
| CN | 109784391 A | 5/2019 | |
| CN | 110248048 A | 9/2019 | |
| CN | 110414321 A | 11/2019 | |
| JP | 2016143351 A | 8/2016 | |
| JP | 2017098637 A | 6/2017 | |
| JP | 2019003585 A | 1/2019 | |
| JP | 2019152964 A | 9/2019 | |
| WO | 2015025704 A1 | 2/2015 | |

OTHER PUBLICATIONS

First Office Action in JP Patent Application No. 2020134860 dated Oct. 14, 2021.
First Office Action in CN Patent Application No. 201911310784.7 dated Feb. 8, 2021.
Second Office Action in CN Patent Application No. 201911310784.7 dated Jun. 24, 2021.
Notice of Allowance in JP Patent Application No. 2020-134860 dated Apr. 26, 2022.

* cited by examiner

VIDEO JITTER DETECTION METHOD AND APPARATUS

CROSS-REFERENCE TO RELATED APPLICATION

This application claims priority to Chinese Patent Application No. 201911310784.7, filed on Dec. 18, 2019, which is hereby incorporated by reference in its entirety.

TECHNICAL FIELD

The present disclosure relates to the technical field of data processing and, in particular, to a video jitter detection method and an apparatus.

BACKGROUND

In recent years, the way people acquire information and the way of entertainment have gradually changed, and the demand for video-type products has grown rapidly. If there is a phenomenon of picture jitter in a video, a user who is watching the video will suffer a poor experience.

Several common methods for detecting whether there is jitter in a video include: an optical flow method based on image displacement, a feature point matching method, and a video jitter detection method based on image gray distribution characteristics. Since video jitter will cause a certain degree of back and forth shaking of pictures, the optical flow method based on image displacement identifies the moving direction of the pictures through optical flows between image frames, thereby detecting whether a video is jittery. The feature point matching method identifies the moving direction of an object in an image by utilizing a feature point matching algorithm, thereby detecting whether a video is jittery. The video jitter detection method based on image gray distribution characteristics performs hypothesis testing in the row direction and in the column direction, respectively, by acquiring the expectation and variance of the row gray value and the expectation and variance of the column gray value, thereby detecting whether a video is jittery.

The above methods all perform detection on a video by utilizing image processing technology, and have complex calculation, lower accuracy and poorer robustness.

SUMMARY

The present disclosure provides a video jitter detection method and an apparatus, which improve the detection accuracy and robustness of video jitter.

In a first aspect, an embodiment of the present disclosure provides a video jitter detection method, including:
acquiring a video;
inputting the video into a detection model to obtain an evaluation value of the video, where the evaluation value is used to indicate a degree of jitter of the video; where the detection model is a model obtained by training using video samples in a video sample set as inputs, and evaluation values of the video samples in the video sample set as outputs.

Optionally, before inputting the video into the detection model, the method further includes:
acquiring a duration of the video; and
acquiring a first video from the video if the duration is greater than a preset duration, where a duration of the first video is equal to the preset duration; and
the inputting the video into a detection model includes:
inputting the first video into the detection model.

Optionally, the acquiring a first video from the video includes:
acquiring, in the video, the first video from a starting time of the video; or,
acquiring, from the video, multiple segments of short videos with time intervals therebetween, connecting the multiple segments of short videos and determining the connected video as the first video.

Optionally, the video sample set includes a first subset and a second subset, where video samples included in the first subset are labeled with evaluation values, and video samples included in the second subset are not labeled with evaluation values;
before inputting the video into the detection model, the method further includes:
training the detection model;
the training the detection model includes:
obtaining a first model by training using the video samples in the first subset as inputs, and the evaluation values of the video samples in the first subset as outputs;
inputting the video samples in the second subset into the first model to obtain evaluation values of the video samples in the second subset;
acquiring a modified second subset by manually correcting evaluation values for video samples, whose evaluation values are greater than a first numerical value, in the second subset, where the video samples in the modified second subset are labeled with evaluation values; and
obtaining the detection model by training using the video samples in the first subset and the video samples in the modified second subset as inputs, and the evaluation values respectively corresponding to the video samples in the first subset and the video samples in the modified second subset as outputs.

Optional, the method further includes:
acquiring a third subset, where the third subset includes multiple video samples that are not labeled with evaluation values;
inputting the video samples in the third subset into the detection model to obtain evaluation values of the video samples in the third subset;
acquiring check samples from the third subset, where the check samples are video samples whose evaluation values obtained through the detection model are greater than a second numerical value and whose evaluation values corrected manually are less than a third numerical value, where the third numerical value is less than the second numerical value; and
training the detection model using the video samples in the first subset, the video samples in the modified second subset and the check sample as inputs, and the evaluation values respectively corresponding to the video samples in the first subset, the video samples in the modified second subset and the check samples as outputs, to correct the detection model.

Optionally, the number of the video samples included in the first subset is less than the number of the video samples included in the second subset.

In a second aspect, an embodiment of the present disclosure provides a video jitter detection apparatus, including:
an acquiring module, configured to acquire a video;
a detecting module, configured to input the video into a detection model to obtain an evaluation value of the video, where the evaluation value is used to indicate a degree of jitter of the video; where the detection model is a model obtained by training using video samples in a video sample set as inputs, and evaluation values of the video samples in the video sample set as outputs.

Optionally, the acquiring module is further configured to:
acquire a duration of the video; and
acquire a first video from the video if the duration is greater than a preset duration, where a duration of the first video is equal to the preset duration; and
the detecting module is specifically configured to input the first video into the detection model.

Optionally, the acquiring module is specifically configured to:
acquire, in the video, the first video from a starting time of the video; or,
acquire, from the video, multiple segments of short videos with time intervals therebetween, connect the multiple segments of short videos and determine the connected video as the first video.

Optionally, the video sample set includes a first subset and a second subset, where video samples included in the first subset are labeled with evaluation values, and video samples included in the second subset are not labeled with evaluation values;
the apparatus further includes a training module, where the training module is configured to:
obtain a first model by training using the video samples in the first subset as inputs, and the evaluation values of the video samples in the first subset as outputs;
input the video samples in the second subset into the first model to obtain evaluation values of the video samples in the second subset;
acquire a modified second subset by manually correcting evaluation values for video samples, whose evaluation values are greater than a first numerical value, in the second subset, where the video samples in the modified second subset are labeled with evaluation values; and
obtain the detection model by training using the video samples in the first subset and the video samples in the modified second subset as inputs, and the evaluation values respectively corresponding to the video samples in the first subset and the video samples in the modified second subset as outputs.

Optionally, the training module is further configured to:
acquire a third subset, where the third subset includes multiple video samples that are not labeled with evaluation values;
input the video samples in the third subset into the detection model to obtain evaluation values of the video samples in the third subset;
acquire check samples from the third subset, where the check samples are video samples whose evaluation values obtained through the detection model are greater than a second numerical value and whose evaluation values corrected manually are less than a third numerical value, where the third numerical value is less than the second numerical value; and
train the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

Optionally, the number of the video samples included in the first subset is less than the number of the video samples included in the second subset.

In a third aspect, an embodiment of the present disclosure provides a video jitter detection apparatus, including: a memory and a processor; where the memory is configured to store program instructions; and
the processor is configured to call the program instructions stored in the memory to implement the method provided by any implementation of the first aspect of the present disclosure.

In a fourth aspect, an embodiment of the present disclosure provides a computer-readable storage medium, including: a readable storage medium and a computer program, where the computer program is used to implement the method provided by any implementation of the first aspect of the present disclosure.

In a fifth aspect, an embodiment of the present disclosure provides a program product, including a computer program (that is, execution instructions), where the computer program is stored in a readable storage medium. A processor can read the computer program from the readable storage medium, and the processor executes the computer program to implement the method provided by any implementation of the first aspect of the present disclosure.

The present disclosure provides a video jitter detection method and an apparatus. A video to be detected is input into a detection model, and an evaluation value of the video can be obtained through the detection model to determine whether the video is jittery. Since the detection model is a model trained according to a large number of samples, the video jitter detection method provided by the present disclosure has a wider range of application scenarios and improves the detection accuracy and robustness of video jitter.

BRIEF DESCRIPTION OF DRAWINGS

In order to more clearly illustrate the technical solutions in embodiments of the present disclosure or in the prior art, the drawings required for the description of the embodiments or the prior art will be briefly described below. Obviously, the drawings in the following description are some embodiments of the present disclosure, and for those skilled in the art, other drawings can be obtained according to these drawings without any creative efforts.

DESCRIPTION OF EMBODIMENTS

In order to make the objects, technical solutions and advantages of embodiments of the present disclosure more clear, the technical solutions in the embodiments of the present disclosure will be clearly and completely described in combination with the drawings in the embodiments of the present disclosure. Obviously, the described embodiments are part of the embodiments of the present disclosure, but not all of the embodiments. Based on the embodiments of the present disclosure, all other embodiments obtained by those skilled in the art without creative efforts fall within the protection scope of the present disclosure.

The terms "first", "second", "third", "fourth" and the like (if any) in the description and drawings of the present disclosure are used to distinguish similar objects, but are not necessarily used to describe a specific order or a precedence sequence. It should be understood that terms used in this way may be interchanged when appropriate, so that the embodiments of the present disclosure described herein can be implemented for example in other sequence in addition to those illustrated or described herein. Furthermore, the terms "include" and "have" and any of their variations are intended to cover non-exclusive inclusions, for example, processes, methods, systems, products, or devices that include a series of steps or units are not necessarily limited to those steps or units listed explicitly, instead may include other steps or units that are not explicitly listed or that are inherent in these processes, methods, products or devices.

The technical solutions of the present disclosure will be illustrated in detail in the following specific embodiments. The following specific embodiments may be combined with each other, and the same or similar concepts or processes may not be repeated in some embodiments.

Figure 1:
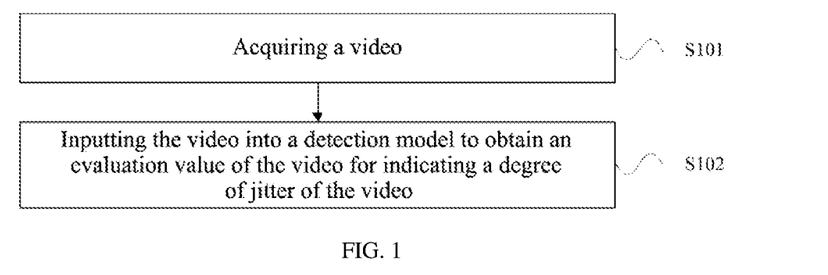
FIG. 1 is a flowchart of a video jitter detection method according to an embodiment of the present disclosure.

FIG. 1 is a flowchart of a video jitter detection method according to an embodiment of the present disclosure. The executive entity of the video jitter detection method provided by this embodiment may be a video jitter detection apparatus. As shown in FIG. 1, the video jitter detection method provided by this embodiment can include:

S101. Acquiring a video.

S102. Inputting the video into a detection model to obtain an evaluation value of the video, where the evaluation value is used to indicate a degree of jitter of the video.

The detection model is a model obtained by training using video samples in a video sample set as inputs, and evaluation values of the video samples in the video sample set as outputs.

Specifically, a video to be detected is acquired, and an evaluation value corresponding to the video to be detected is obtained end-to-end through the detection model, and then it can be determined according to the evaluation value of the video whether there is a phenomenon of jitter in the video. Since the detection model is an end-to-end model obtained by training using a large number of video samples as inputs, and the evaluation values corresponding to the video samples as outputs, good judgment effect on whether there is video jitter in the video and on the degree of video jitter when the video jitter exists is realized. Compared with the video jitter detection based on image processing technology in the prior art, the calculation complexity is reduced, the range of application is expanded with the applicability to the detection of various videos, and the detection accuracy and robustness of video jitter are improved.

It should be noted that the size, file format, video length and the like of the acquired video are not limited in this embodiment.

It should be noted that the implementation of the evaluation value is not limited in this embodiment. Optionally, the evaluation value may include a limited number of discrete values. For example, the evaluation value may include: no jitter, and jitter. The evaluation value may include: no jitter, slight jitter, and severe jitter. The evaluation value may include: 0 and 1, where 0 represents that there is no jitter, and 1 represents that there is jitter. The evaluation value may include: 0, 1, and 2, where 0 represents that there is no jitter, 1 represents that there is slight jitter, and 2 represents that there is severe jitter. Optionally, the evaluation value may be a numerical value in a continuous range. For example, the value range of the evaluation value may be greater than or equal to 0 and less than or equal to 100. The greater the evaluation value is, the more jittery the video is. For example, the jitter of a video with an evaluation value of 80 is more severe than that of a video with an evaluation value of 60. Or, the smaller the evaluation value is, the more jittery the video is. The value range of the evaluation value is not limited in this embodiment. For example, the value range of the evaluation value may be greater than or equal to 0 and less than or equal to 1. Optionally, when the evaluation value has a certain value range, a preset numerical value can be set. The preset numerical value is used to determine whether the video is jittery. For example, the value range of the evaluation value is greater than or equal to 0 and less than or equal to 1, and the greater the evaluation value is, the more jittery the video is. The preset numerical value may be 0.7. When the evaluation value of the video is greater than 0.7, it is determined that the video is jittery, and when the evaluation value of the video is less than or equal to 0.7, it is determined that the video is not jittery. The value of the preset numerical value is not limited in this embodiment.

It should be noted that, the number of the video samples included in the video sample set is not limited in this embodiment. In order to improve the accuracy of the detection model and solve the problem of overfitting during training, the number of the video samples is as large as possible. For example, the number of the video samples may be greater than 10,000, such as 17,000.

It should be noted that, the type of the detection model is not limited in this embodiment. Optionally, the type of the detection model may be any one of the following: a neural network model, a depth algorithm model and a machine algorithm model. Optionally, the neural network model may include, but is not limited to, a fully convolutional network (FCN) model and a convolutional network for biomedical image segmentation (U-net) model.

Optionally, in S102, before inputting the video into the detection model, the method further includes:

acquiring a duration of the video;

acquiring a first video from the video if the duration of the video is greater than a preset duration, where a duration of the first video is equal to the preset duration.

Correspondingly, in S102, the inputting the video into the detection model can include:

inputting the first video into the detection model.

Specifically, if the length of the video to be detected is too long, the time of detection will be increased. Moreover, the shooting environment of the video is usually constant, so if the video to be detected is too long, it can be determined whether the video is jittery by detecting a part of the video, and it is generally not necessary to perform detection on the whole video. Therefore, when the duration of the video to be detected is greater than the preset duration, the first video with the preset duration is acquired from the video to be detected, and the first video is input into the detection model to determine whether the video is jittery, which reduces the amount of calculation, shortens the time of detection and improves the detection efficiency.

It should be noted that, the value of the preset duration is not limited in this embodiment. For example, the preset duration may be 40 seconds.

Optionally, in an implementation, the acquiring the first video from the video may include:

acquiring, in the video, the first video from a starting time of the video.

For example, assuming that the preset duration is 40 seconds, and the duration of the video to be detected is 3 minutes, then the first 40 seconds of the video to be detected is determined as the first video.

Usually, the user is used to watching the video from beginning after clicking on the video. If there is jitter at the beginning of the video, the user's experience when watching the video is directly affected. Therefore, the acquiring the first video from the starting time of the video takes the watching habit of the user into account, which improves the accuracy and effectiveness of video detection, and is closer to the user experience.

Optionally, in another implementation, the acquiring the first video from the video may include:

acquiring, from the video, multiple segments of short videos with time intervals therebetween, connecting the multiple segments of short videos and determining the connected video as the first video.

For example, assuming that the preset duration is 40 seconds and the duration of the video to be detected is 3 minutes, then the first video may include the following time periods in the video to be detected: 0-20 seconds, 60-70 seconds, and 120-130 seconds, or include 0-20 seconds, and 60-80 seconds.

Usually, the user is used to watching the video from beginning after clicking on the video, and the user may jump to different parts of the video for multiple times during the watching. Therefore, determining the multiple segments of short videos in the video as the first video considers the watching habit of the user, which improves the accuracy and effectiveness of video detection, and is closer to the user experience.

It should be noted that, the number and duration of the short videos, and their positions in the video to be detected are not limited in this embodiment.

Optionally, in S102, before inputting the video into the detection model, the method further includes:

training the detection model.

It should be noted that, the training method of the detection model is not limited in this embodiment, and may vary according to different types of the model. For example, during the training, frame-cut processing may be performed on the video with 5 frames per second, and the video frame is scaled to the size of 224*224 in the format of a three-primary-color (Red, Green, Blue, RGB) image.

It can be seen that, this embodiment provides a video jitter detection method, in which the video to be detected is input into the detection model, and the evaluation value of the video can be obtained through the detection model to determine whether the video is jittery. Since the detection model is the model trained according to a large number of samples, the video jitter detection method provided by this embodiment has a wider range of application scenarios, and improves the detection accuracy and robustness of video jitter.

Figure 2:
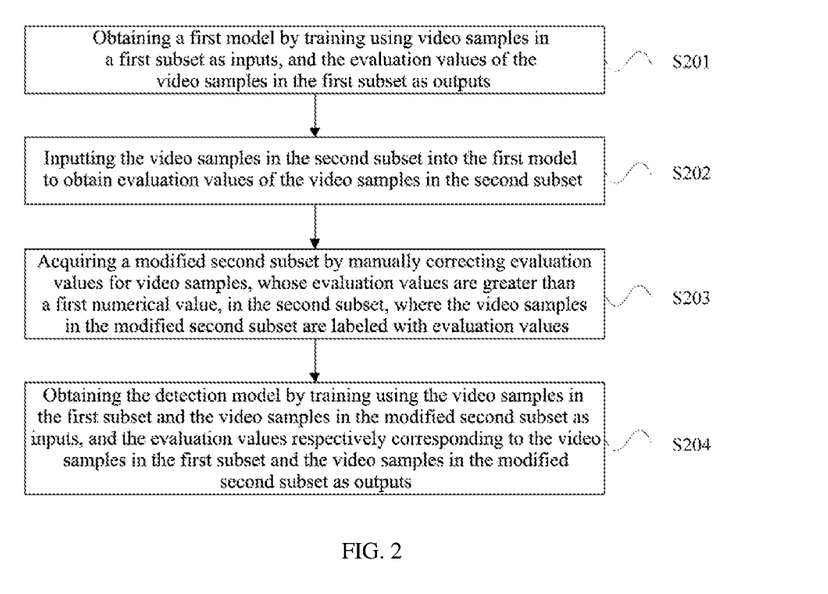
FIG. 2 is another flowchart of a video jitter detection method according to an embodiment of the present disclosure.

FIG. 2 is another flowchart of a video jitter detection method according to an embodiment of the present disclosure. A training process of the detection model is illustrated in this embodiment. In this embodiment, the video sample set can include a first subset and a second subset. Video samples included in the first subset are labeled with evaluation values, and video samples included in the second subset are not labeled with evaluation values. As shown in FIG. 2, the training the detection model can include:

S201. Obtaining a first model by training using the video samples in the first subset as inputs, and the evaluation values of the video samples in the first subset as outputs.

S202. Inputting the video samples in the second subset into the first model to obtain evaluation values of the video samples in the second subset.

S203. Acquiring a modified second subset by manually correcting evaluation values for video samples, whose evaluation values are greater than a first numerical value, in the second subset, where the video samples in the modified second subset are labeled with evaluation values.

S204. Obtaining the detection model by training using the video samples in the first subset and the video samples in the modified second subset as inputs, and the evaluation values respectively corresponding to the video samples in the first subset and the video samples in the modified second subset as outputs.

Illustration is given in combination with examples in the following.

Assuming that the video sample set includes 17,000 video samples in total, where the first subset includes 1,000 video samples, and these 1000 video samples are labeled with evaluation values. The acquisition of the evaluation values of the video samples in the first subset is not limited in this embodiment, for example, they may be acquired through manually labeling. The second subset includes 16,000 video samples, and these 16,000 video samples are not labeled with evaluation values.

The training process of the detection model can include that:

the first model is obtained by training using the 1000 video samples in the first subset as inputs, and the evaluation values respectively corresponding to the 1000 video samples as outputs. Then, the 16,000 video samples in the second subset are input into the first model to obtain evaluation values respectively corresponding to the 16,000 video samples. Then, the modified second subset corresponding to the second subset is acquired. Specifically, through manual correction, the evaluation values are manually corrected for the video samples, whose evaluation values are greater than the first numerical value, in the second subset. For convenience of explanation, for the evaluation values of the video samples in the second subset, the evaluation values obtained through the first model are denoted as evaluation values P1, and the evaluation values obtained through the manual correction are denoted as evaluation values P2. For example, the first numerical value is 0.7. The evaluation value P1 of a video sample 1 in the second subset is 0.8. The evaluation value P2 of the video sample 1 is obtained by performing manual correction for the video sample 1, and may be 0.6. Finally, the detection model is obtained by training using the 1000 video samples in the first subset and the 16,000 video samples in the modified second subset as inputs, and the evaluation value of each video sample as the output.

It can be seen that, the first model is obtained by training using a part of video samples in the video sample set, and the accuracy rate needs to be improved. The video samples included in the second subset are not labeled with evaluation values. First, the evaluation value of each video sample can be obtained through the first model. Since there may be an error in the first model, manual correction is performed on video samples with higher evaluation values output by the first model. Then, according to the video samples in the first subset and the modified second subset, training is continued based on the first model, to obtain an accurate detection model.

S203 to S204 can be executed in loop for multiple times, and the number of execution is not limited in this embodiment.

The value of the first numerical value is not limited in this embodiment.

Optionally, the number of the video samples included in the first subset may be less than the number of the video samples included in the second subset, which reduces the difficulty of acquiring the first subset.

Optionally, after S204, the method further includes:

acquiring a third subset, where the third subset includes multiple video samples that are not labeled with evaluation values;

inputting the video samples in the third subset into the detection model to obtain evaluation values of the video samples in the third subset;

acquiring check samples from the third subset, where the check samples are video samples whose evaluation values obtained through the detection model are greater than a second numerical value and whose evaluation values corrected manually are less than a third numerical value, where the third numerical value is less than the second numerical value; and training the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

Illustration is given in combination with the above examples in the following.

Assuming that the third subset includes 10,000 video samples, and these 10,000 video samples are not labeled with evaluation values.

The training process of the detection model can also include that:

the 10,000 video samples in the third subset are input into the detection model, to obtain evaluation values respectively corresponding to the 10,000 video samples. The check samples are acquired from the third subset. Specifically, manual correction is performed on the video samples, whose evaluation values obtained using the detection model are greater than the second numerical value, in the third subset. For convenience of explanation, for the evaluation values of the video samples in the third subset, the evaluation values obtained through the detection model are denoted as evaluation values Q1, and the evaluation values obtained through the manual correction are denoted as evaluation values Q2. For example, the second numerical value is 0.7. The evaluation value Q1 of a video sample 1 in the third subset is 0.8. The evaluation value Q2 of the video sample 1 is obtained by performing manual correction on the video sample 1, and may be 0.6. The video sample 1 is a check sample. Assuming that the number of the check samples is 2000. Finally, the detection model is trained using the 1000 video samples in the first subset, the 16,000 video samples in the modified second subset and the 2000 check samples as inputs, and the evaluation value of each video sample as the output, so as to correct the detection model.

It can be seen that, the accuracy of the detection model is further improved by performing correction on the detection model through the third subset.

Figure 3:
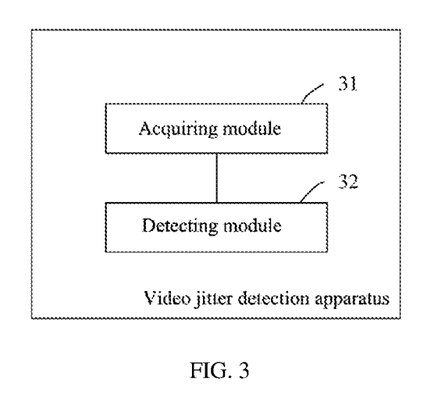
FIG. 3 is a schematic structural diagram of a video jitter detection apparatus according to an embodiment of the present disclosure.

FIG. 3 is a schematic structural diagram of a video jitter detection apparatus according to an embodiment of the present disclosure. The video jitter detection apparatus provided by this embodiment is used to execute the video jitter detection methods provided by the embodiments shown in FIG. 1 to FIG. 2. As shown in FIG. 3, the video jitter detection apparatus provided by this embodiment can include:

an acquiring module 31, configured to acquire a video;

a detecting module 32, configured to input the video into a detection model to obtain an evaluation value of the video, where the evaluation value is used to indicate a degree of jitter of the video; where the detection model is a model obtained by training using video samples in a video sample set as inputs, and evaluation values of the video samples in the video sample set as outputs.

Optionally, the acquiring module 31 is further configured to:

acquire a duration of the video;

acquire a first video from the video if the duration is greater than a preset duration, where a duration of the first video is equal to the preset duration; and the detecting module 32 is specifically configured to input the first video into the detection model.

Optionally, the acquiring module 31 is specifically configured to:

acquire, in the video, the first video from a start time of the video; or, acquire, from the video, multiple segments of short videos with time intervals therebetween, connecting the multiple segments of short videos and determining the connected video as the first video.

Optionally, the video sample set includes a first subset and a second subset, where the video samples included in the first subset are labeled with evaluation values, and the video samples included in the second subset are not labeled with evaluation values;

the apparatus further includes a training module, which is configured to:

obtain a first model by training using the video samples in the first subset as inputs, and the evaluation values of the video samples in the first subset as outputs;

input the video samples in the second subset into the first model to obtain evaluation values of the video samples in the second subset;

acquire a modified second subset by manually correcting evaluation values for video samples, whose evaluation values are greater than a first numerical value, in the second subset, where the video samples in the modified second subset are labeled with evaluation values; and obtain the detection model by training using the video samples in the first subset and the video samples in the modified second subset as inputs, and the evaluation values respectively corresponding to the video samples in the first subset and the video samples in the modified second subset as outputs.

Optionally, the training module is further configured to:

acquire a third subset, where the third subset includes multiple video samples that are not labeled with evaluation values;

input the video samples in the third subset into the detection model to obtain evaluation values of the video samples in the third subset;

acquire check samples from the third subset, where the check samples are video samples whose evaluation values obtained through the detection model are greater than a second numerical value and whose evaluation values corrected manually are less than a third numerical value, where the third numerical value is less than the second numerical value; and train the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

Optionally, the number of the video samples included in the first subset is smaller than the number of the video samples included in the second subset.

The video jitter detection apparatus provided by this embodiment is used to execute the video jitter detection methods provided by the embodiments shown in FIG. 1 to FIG. 2. The technical principles and technical effects thereof are similar, and will not be repeated here.

Figure 4:
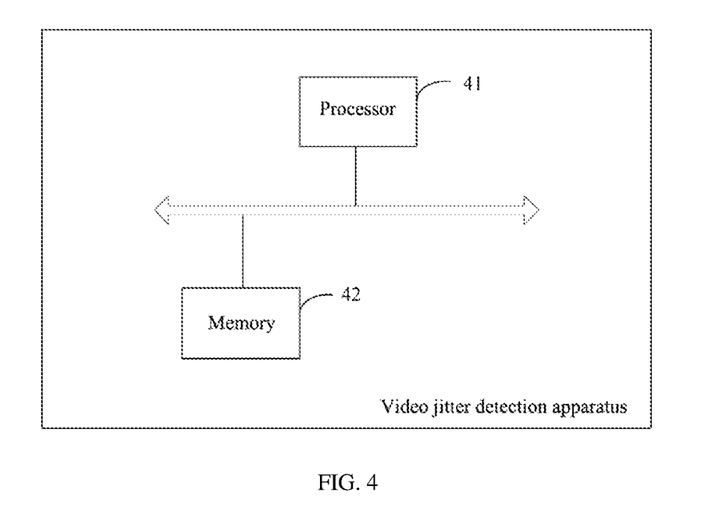
FIG. 4 is another schematic structural diagram of a video jitter detection apparatus according to an embodiment of the present disclosure.

FIG. 4 is another schematic structural diagram of a video jitter detection apparatus according to an embodiment of the present disclosure. As shown in FIG. 4, the video jitter detection apparatus can include a processor 41 and a memory 42. The memory 42 is configured to store instructions, and the processor 41 is configured to execute the instructions stored in the memory 42 to cause the video jitter detection apparatus to execute the video jitter detection methods provided by the embodiments shown in FIG. 1 to FIG. 2. The technical principles and technical effects thereof are similar, and will not be repeated here.

It should be noted that the present disclosure does not limit the device form and specific structure of the video jitter detection apparatus.

Figure 5:
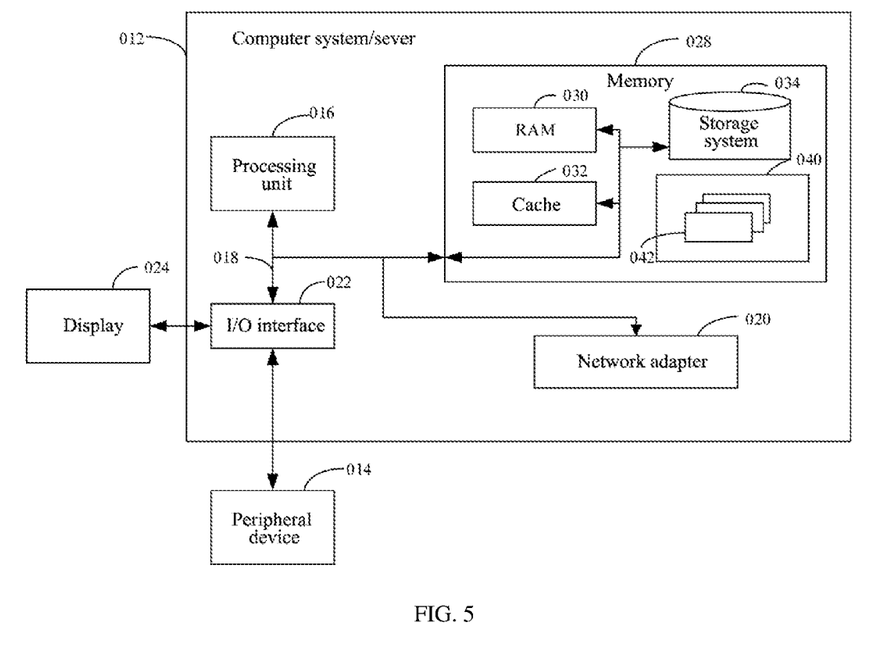
FIG. 5 is a schematic structural diagram of an exemplary computer system/server according to an embodiment of the present disclosure, where the computer system/server is used for implementing embodiments of the present disclosure.

Exemplary, FIG. 5 is a schematic structural diagram of an exemplary computer system/server according to an embodiment of the present disclosure, where the computer system/server is used for implementing embodiments of the present disclosure. The computer system/server 012 shown in FIG. 5 is only an example, and should not impose any limitation on the function and usage range of the embodiments of the present disclosure.

As shown in FIG. 5, the computer system/server 012 is represented in a form of a general-purpose computing device. Components of the computer system/server 012 may include, but are not limited to: one or more processors or processor units 016, a system memory 028, and a bus 018 connecting different system components (including the system memory 028 and the processors 016).

The bus 018 represents one or more of several types of bus structures, including a memory bus or a memory controller, a peripheral bus, a graphic acceleration port, a processor, or a local bus using any of multiple bus structures. By way of example, these architectures include, but are not limited to, an industry standard architecture (ISA) bus, a micro channel architecture (MAC) bus, an enhanced ISA bus, a video electronics standards association (VESA) local bus, and a peripheral component interconnect (PCI) bus.

The computer system/server 012 typically includes a variety of computer system readable media. These media may be any available medium that can be accessed by the computer system/server 012, including volatile and non-volatile medium, removable and non-removable medium.

The system memory 028 may include computer system readable medium in a form of volatile memory, such as a random access memory (RAM) 030 and/or a cache memory 032. The computer system/server 012 may further include other removable/non-removable, volatile/nonvolatile computer system storage medium. For example only, a storage system 034 may be used to read and write on a non-removable, non-volatile magnetic medium (which is not shown in FIG. 5 and is commonly referred as a "hard driver"). Although not shown in FIG. 5, a disk drive for reading and writing on a removable non-volatile disk (for example, a "floppy disk") and an optical drive for reading and writing on a removable non-volatile optical disk (for example, a compact disc read-only memory (CD-ROM), a digital video disk-ROM (DVD-ROM) or other optical medium) may be provided. In these cases, each drive may be connected to the bus 018 through one or more data medium interfaces. The memory 028 may include at least one program product, which has a set of (for example, at least one) program modules, and these program modules are configured to implement functions of various embodiments of the present disclosure.

A program/utility tool 040 having a set of (at least one) program modules 042 may be stored in, for example, the memory 028. Such program modules 042 include, but are not limited to, an operating system, one or more application programs, other program modules, and program data. Each of these examples, or a certain combination thereof, may include an implementation of a network environment. The program modules 042 generally implement functions and/or methods in the embodiments described in the present disclosure.

The computer system/server 012 may also communicate with one or more peripheral devices 014 (for example, a keyboard, a pointing device, a display 024, and the like), and may also communicate with one or more devices that enable a user to interact with the computer system/server 012, and/or communicate with any device (such as a network card, a modem, and the like) that enables the computer system/server 012 to communicate with one or more other computing devices. Such communication may be performed through an input/output (I/O) interface 022. Moreover, the computer system/server 012 may also communicate with one or more networks (such as a local area network (LAN), a wide area network (WAN), and/or a public network, such as Internet) through a network adapter 020. As shown in FIG. 5, the network adapter 020 communicates with other modules of the computer system/server 012 through the bus 018. It should be understood that although not shown in FIG. 5, other hardware and/or software modules may be used in combination with the computer system/server 012, including but not limited to: microcode, device drivers, redundant processors, external disk drive arrays, redundant array of independent disks (RAID) systems, tape drives, data backup storage systems, and the like.

The processor 016 executes the functions and/or methods in the embodiments described in the present disclosure by running the program stored in the system memory 028.

The above-mentioned computer program may be provided in a computer storage medium, that is, the computer storage medium is encoded with a computer program, and when executed by one or more computers, the program causes the one or more computers to execute the method flows and/or apparatus operations shown in the foregoing embodiments of the present disclosure.

A person of ordinary skill in the art may understand that: the implementation of all or part of the steps of the foregoing various method embodiments may be completed by hardware related to program instructions. The aforementioned program may be stored in a computer readable storage medium. When the program is executed, the steps including the foregoing various method embodiments are executed; and the foregoing storage medium includes various media that can store program codes, such as a ROM, a RAM, a magnetic disk, or an optical disc.

Finally, it should be noted that the above embodiments are merely intended for describing, rather than limiting, the technical solutions of the present disclosure. Although the embodiments of the present disclosure have been illustrated in detail with reference to the foregoing embodiments, those skilled in the art will understand that they may still make modifications to the technical solutions described in the foregoing embodiments, or make equivalent substitutions to some or all of the technical features therein, and these modifications or substitutions do not make the essence of the corresponding technical solutions deviate from the scope of the technical solutions of the embodiments of the present disclosure.

What is claimed is:

1. A video jitter detection method, comprising:
   acquiring a video;
   inputting the video into a detection model to obtain an evaluation value of the video, wherein the evaluation value is used to indicate a degree of jitter of the video; wherein the detection model is a model obtained by training using video samples in a video sample set as inputs, and evaluation values of the video samples in the video sample set as outputs;
   wherein the video sample set comprises a first subset and a second subset, wherein video samples comprised in the first subset are labeled with evaluation values, and video samples comprised in the second subset are not labeled with evaluation values.

2. The method according to claim 1, before inputting the video into the detection model, further comprising:
   acquiring a duration of the video; and
   acquiring a first video from the video if the duration is greater than a preset duration, wherein a duration of the first video is equal to the preset duration; and
   the inputting the video into a detection model comprises: inputting the first video into the detection model.

3. The method according to claim 2, wherein the acquiring a first video from the video comprises:
   acquiring, in the video, the first video from a starting time of the video; or,
   acquiring, from the video, multiple segments of short videos with time intervals therebetween, connecting the multiple segments of short videos and determining the connected video as the first video.

4. The method according to claim 1, wherein the
   before inputting the video into the detection model, the method further comprises:
   training the detection model;
   the training the detection model comprises:
   obtaining a first model by training using the video samples in the first subset as inputs, and the evaluation values of the video samples in the first subset as outputs;
   inputting the video samples in the second subset into the first model to obtain evaluation values of the video samples in the second subset;
   acquiring a modified second subset by manually correcting evaluation values for video samples, whose evaluation values are greater than a first numerical value, in the second subset, wherein the video samples in the modified second subset are labeled with evaluation values; and
   obtaining the detection model by training using the video samples in the first subset and the video samples in the modified second subset as inputs, and the evaluation values respectively corresponding to the video samples in the first subset and the video samples in the modified second subset as outputs.

5. The method according to claim 4, further comprising:
   acquiring a third subset, wherein the third subset comprises multiple video samples that are not labeled with evaluation values;
   inputting the video samples in the third subset into the detection model to obtain evaluation values of the video samples in the third subset;
   acquiring check samples from the third subset, wherein the check samples are video samples whose evaluation values obtained through the detection model are greater than a second numerical value and whose evaluation values corrected manually are less than a third numerical value, wherein the third numerical value is less than the second numerical value; and
   training the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

6. The method according to claim 4, wherein the number of the video samples comprised in the first subset is less than the number of the video samples comprised in the second subset.

7. A video jitter detection apparatus, comprising: a memory and a processor; wherein,
   the memory is configured to store program instructions; and
   the processor is configured to call the program instructions stored in the memory to implement the following steps:
   acquiring a video;
   inputting the video into a detection model to obtain an evaluation value of the video, wherein the evaluation value is used to indicate a degree of jitter of the video; wherein the detection model is a model obtained by training using video samples in a video sample set as inputs, and evaluation values of the video samples in the video sample set as outputs;
   wherein the video sample set comprises a first subset and a second subset, wherein video samples comprised in the first subset are labeled with evaluation values, and video samples comprised in the second subset are not labeled with evaluation values.

8. The apparatus according to claim 7, wherein the processor is further configured to call the program instructions stored in the memory to implement the following steps:
   acquiring a duration of the video; and
   acquiring a first video from the video if the duration is greater than a preset duration, wherein a duration of the first video is equal to the preset duration; and
   the processor is further configured to call the program instructions stored in the memory to implement the following step:
   inputting the first video into the detection model.

9. The apparatus according to claim 8, wherein the processor is further configured to call the program instructions stored in the memory to implement the following steps:
   acquiring, in the video, the first video from a starting time of the video; or,
   acquiring, from the video, multiple segments of short videos with time intervals therebetween, connecting the multiple segments of short videos and determining the connected video as the first video.

10. The apparatus according to claim 7, wherein the processor is further configured to call the program instructions stored in the memory to implement the following steps:
obtaining a first model by training using the video samples in the first subset as inputs, and the evaluation values of the video samples in the first subset as outputs;
inputting the video samples in the second subset into the first model to obtain evaluation values of the video samples in the second subset;
acquiring a modified second subset by manually correcting evaluation values for video samples, whose evaluation values are greater than a first numerical value, in the second subset, wherein the video samples in the modified second subset are labeled with evaluation values; and
obtaining the detection model by training using the video samples in the first subset and the video samples in the modified second subset as inputs, and the evaluation values respectively corresponding to the video samples in the first subset and the video samples in the modified second subset as outputs.

11. The apparatus according to claim 10, wherein processor is further configured to call the program instructions stored in the memory to implement the following steps:
acquiring a third subset, wherein the third subset comprises multiple video samples that are not labeled with evaluation values;
inputting the video samples in the third subset into the detection model to obtain evaluation values of the video samples in the third subset;
acquiring check samples from the third subset, wherein the check samples are video samples whose evaluation values obtained through the detection model are greater than a second numerical value and whose evaluation values corrected manually are less than a third numerical value, wherein the third numerical value is less than the second numerical value; and
training the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

12. The apparatus according to claim 10, wherein the number of the video samples comprised in the first subset is less than the number of the video samples comprised in the second subset.

13. A computer-readable storage medium, comprising: a readable storage medium and a computer program, wherein the computer program is used to implement the following steps:
acquiring a video;
inputting the video into a detection model to obtain an evaluation value of the video, wherein the evaluation value is used to indicate a degree of jitter of the video; wherein the detection model is a model obtained by training using video samples in a video sample set as inputs, and evaluation values of the video samples in the video sample set as outputs;
wherein the video sample set comprises a first subset and a second subset, wherein video samples comprised in the first subset are labeled with evaluation values, and video samples comprised in the second subset are not labeled with evaluation values.

14. The computer-readable storage medium according to claim 13, wherein the computer program is further used to implement the following steps:
acquiring a duration of the video; and
acquiring a first video from the video if the duration is greater than a preset duration, wherein a duration of the first video is equal to the preset duration; and
the computer program is further used to implement the following step:
inputting the first video into the detection model.

15. The computer-readable storage medium according to claim 14, wherein the computer program is further used to implement the following steps:
acquiring, in the video, the first video from a starting time of the video; or,
acquiring, from the video, multiple segments of short videos with time intervals therebetween, connecting the multiple segments of short videos and determining the connected video as the first video.

16. The computer-readable storage medium according to claim 13, wherein
the computer program is further used to implement the following steps:
obtaining a first model by training using the video samples in the first subset as inputs, and the evaluation values of the video samples in the first subset as outputs;
inputting the video samples in the second subset into the first model to obtain evaluation values of the video samples in the second subset;
acquiring a modified second subset by manually correcting evaluation values for video samples, whose evaluation values are greater than a first numerical value, in the second subset, wherein the video samples in the modified second subset are labeled with evaluation values; and
obtaining the detection model by training using the video samples in the first subset and the video samples in the modified second subset as inputs, and the evaluation values respectively corresponding to the video samples in the first subset and the video samples in the modified second subset as outputs.

17. The computer-readable storage medium according to claim 16, wherein the computer program is further used to implement the following steps:
acquiring a third subset, wherein the third subset comprises multiple video samples that are not labeled with evaluation values;
inputting the video samples in the third subset into the detection model to obtain evaluation values of the video samples in the third subset;
acquiring check samples from the third subset, wherein the check samples are video samples whose evaluation values obtained through the detection model are greater than a second numerical value and whose evaluation values corrected manually are less than a third numerical value, wherein the third numerical value is less than the second numerical value; and
training the detection model using the video samples in the first subset, the video samples in the modified second subset and the check samples as inputs, and the evaluation values respectively corresponding to the video samples in the first subset, the video samples in the modified second subset and the check samples as outputs, to correct the detection model.

18. The computer-readable storage medium according to claim 16, wherein the number of the video samples comprised in the first subset is less than the number of the video samples comprised in the second subset.

* * * * *